May 17, 1966  B. T. WILLMAN  3,251,414
METHOD FOR CONTROL OF WATER INJECTION PROFILES
Filed Oct. 30, 1962
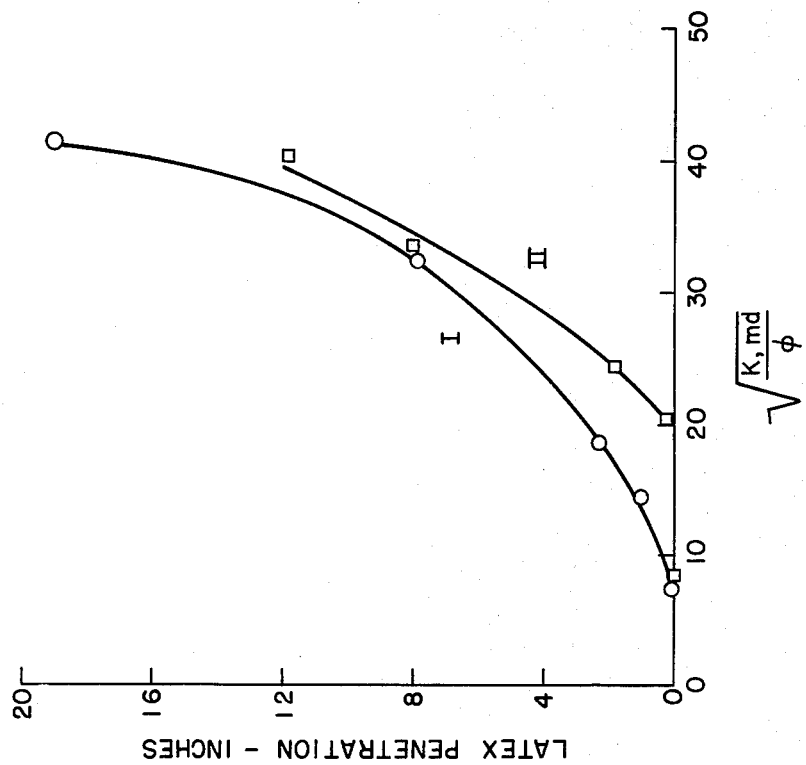
BERTRAM T. WILLMAN INVENTOR.
BY *Gary C. Honeycutt*
ATTORNEY

United States Patent Office 3,251,414
Patented May 17, 1966

3,251,414
METHOD FOR CONTROL OF WATER INJECTION PROFILES
Bertram T. Willman, Corpus Christi, Tex., assignor, by mesne assignments, to Esso Production Research Company, a corporation of Delaware
Filed Oct. 30, 1962, Ser. No. 234,125
2 Claims. (Cl. 166—33)

This invention relates generally to a method for reducing the permeability of a porous underground stratum by forming deposits or precipitates in the pore spaces of such a formation, and more particularly, to an improved method of selectively reducing the permeability of an underground formation in such a manner as to prevent or reduce the flow of fluids through the more permeable zones thereof without substantially reducing the permeability of the less permeable zones. The selective plugging agents of the invention are polymeric elastomer latices or dispersions having a limited particle size distribution and a critical, preselected particle diameter.

In a preferred application of the method, selective plugging is employed to control the injectivity profile of a permeable subterranean formation surrounding a wellbore, for example, an input well of a waterflood project in the secondary recovery of petroleum. Typically, permeabilities and pore diameters through an oil-bearing reservoir section vary greatly with depth. A ten-fold or even a hundred-fold variation in permeability is common. When flood water or other displacing medium is injected into such a reservoir the highly permeable zones or streaks have a natural tendency to accept substantially the entire volume of injection flow, to the substantial exclusion of the less permeable zones. This uneven flow pattern, if uncorrected, is obviously a great detriment to the operation and can lead to its complete failure.

The problem of uneven flow also arises in a pattern waterflood where the reservoir is composed of a plurality of non-communicating layers. The flood water preferentially fingers through the more permeable layers, causing a premature breakthrough of water at the producing wells. This situation can also be corrected by selectively plugging off the more permeable layers, by injecting a suitable latex at either the injection wells or the producing wells.

Another application of the invention lies in facilitating the completion or stimulation of a production well. Increased fluid recovery from subterranean reservoirs can be effected by a number of techniques, such as acidizing or hydraulic fracturing, which enhance the efficiency of reservoir drainage. When employing these techniques, it is desirable to take preliminary steps in treating formations having widely differing permeability to ensure that most of the treating fluid is injected into the less permeable zones or streaks, while little or no treating fluid is introduced into the more permeable streaks. This can be accomplished by selectively plugging the more permeable zones in accordance with the present invention.

It is equally important in many completed wells to selectively plug off a water-bearing zone in order to permit the recovery of produced oil or gas relatively free of water. If the water-producing zone is relatively more porous than the oil or gas producing zone, it may be sealed off in accordance with the method of the present invention. An example of such water production involves the presence of a water-bearing formation immediately below the oil-producing zone. As oil is withdrawn, water from the lower formation tends to rise in the vicinity of the wellbore, to the level of the producing string. This condition, known as "coning," is frequently severe and has forced the abandonment of many wells.

It will be readily appreciated that in addition to the above applications the method of the present invention is useful whenever it is desirable to selectively plug a highly permeable zone of a subterranean reservoir without substantially reducing the permeability of adjacent, less permeable zones.

It has now been found that the particle diameter of a polymeric elastomer latex is a critical factor in determining whether or not a given latex is capable of invading a porous earth formation. A latex of large particle diameter will not invade sandstones, for example, even in the absence of coagulation at the surface of the rock. Small particle diameter latices do, however, invade. Thus it is possible to select a critical particle diameter for the elastomeric solids in a latex, that will either permit invasion or that will result in no invasion. Moreover, the critical selection of particle diameter can be made as a function of formation porosity and permeability, which reflects the effective pore diameter of the rock.

The selective plugging agents of the present invention are oil-resistant polymeric elastomer latices, dispersions or suspensions. These materials are aqueous dispersions of polymeric elastomers, including natural and synthetic rubber latices, both virgin and reclaimed. Mixtures of natural and synthetic latices are also useful. Preferred latices are derived from synthetic elastomers prepared by the polymerization of olefinically unsaturated hydrocarbons, or by the copolymerization of such hydrocarbons with other olefinically unsaturated monomers. The olefinically unsaturated hydrocarbons include olefins such as isobutylene and the pentylenes; diolefins such as butadiene, isoprene, piperylene, dimethyl butadiene and 2-methyl pentadiene; vinyl aromatics such as styrene, methyl styrene and vinyl toluene. Mixtures of two or more of such hydrocarbons have also been found suitable. Olefinically unsaturated monomers which may be copolymerized with the hydrocarbons include halogenated olefinically unsaturated compounds such as vinyl chloride, allyl chloride and chloroprene, unsaturated esters such as vinyl acetate, allyl propionate, methyl methacrylate, ethyl acrylate, methyl fumarate, ethyl maleate and propyl itaconate. Unsaturated nitriles such as acrylonitrile, methacrylonitrile, ethyl acrylonitrile and chloroacrylonitrile. Also included are unsaturated ketones such as methyl vinyl ketones, cyclic vinyl compounds such as vinyl pyridine, and mixtures thereof. It will be recognized that not all of these elastomers are equally effective for use in preparing a selective plugging material.

Specific examples of elastomers prepared from the foregoing monomers, which are suitable in the form of latices for use as selective plugging agents include polyisobutylene, polystyrene, polybutadiene, polyisoprene, butadiene-isoprene copolymers, isoprene-isobutylene copolymers, isobutylene-styrene copolymers, piperylene-vinyl acetate copolymers, butadiene-styrene-vinyl chloride copolymers, butadiene-acrylonitrile copolymers, butadiene-methacrylonitrile copolymers and isoprene-chloroprene-vinyl acetate copolymers.

Latices containing the foregoing elastomers may be prepared by the emulsion polymerization of suitable monomers or by the emulsification of organic solutions of dry elastomers with water or other liquid followed by removal of the organic solvent. The method utilized will depend primarily on the elastomer used. Many conjugated diolefin polymers and copolymers of conjugated diolefins with monomers containing a vinylidene linkage, polybutadiene and copolymers of 1,3-butadiene with styrene, acrylonitrile or vinyl chloride for example can readily be prepared by emulsion polymerization and recovery in the latex form. Other elastomers, such as styrene-isobutylene and isobutylene-isoprene copolymers are best prepared by bulk or solution polymerization in processes which do not result in the formation of latices. Elastomers prepared in the latter manner must subsequently be emulsified with the aid of a solvent to produce latices. Processes for preparing latices by both methods are widely described in the chemical and patent literature. A typical emulsion copolymerization process is described in U.S. Patent 2,460,038 issued to George E. Serniuk on January 25, 1949. A description of one method for preparing latices from dry elastomers utilizing an organic solvent may be found in U.S. Patent 2,799,662 issued to John L. Ernst et al. on July 16, 1957.

Typically, latices of the invention are characterized by elastomer particle sizes ranging between about 0.05 and about 2 microns in diameter. Present technology permits the manufacture of synthetic latices having a substantially more uniform distribution of particle sizes than is characteristic of natural rubber latex. Commercial materials are commonly available with particle sizes under 0.1 micron in diameter, prepared by emulsion polymerization techniques. On the other hand, dispersions of reclaim rubber can be made with particles larger than 2 microns in diameter.

Specific examples of suitable commercial latices are "Naugatex 2000," "Naugatex 2002," and "Naugatex 2113." "Naugatex" is a registered trademark of the Naugatuck Chemical Division of the United States Rubber Company, Naugatuck, Connecticut. These latices are prepared by emulsion copolymerization of butadiene with styrene, and contain 46%, 46% and 44%, respectively, of bound styrene. The reported particle size of the above latices is 0.1 micron, 0.12 micron, and 0.08 micron, respectively.

Other suitable examples are "Nitrex 2616" and "Nitrex 2625," also available from the Naugatuck Chemical Division of U.S. Rubber. The first of these is a butadiene-acrylonitrile copolymer having 45% bound acrylonitrile and a particle size of 0.07 micron. The other is a butadiene-styrene-acrylonitrile terpolymer having 29% bound styrene, 33% bound acrylonitrile, and a particle size of 0.2 micron.

Still another example of a suitable commercial latex is "Enjay Butyl Latex 80–21" which is an emulsion of butyl rubber in water, containing about 55% solids, marketed by Enjay Company, Inc., New York 19, New York. The average particle diameter of the dispersed phase is 0.5 micron.

The stated particle sizes of the various commercially available latices are approximate average particle diameters. The distribution or range of particle sizes found in most latices is relatively broad, while in others the particles have a substantially uniform diameter. It may appear reasonable at first to expect that the smallest particles of a given latex would invade and seal all zones having an effective pore diameter large enough to permit entry of the smallest particles, even though the majority of elastomer particles in the given latex are too large to invade. Actually, however, no substantial invasion occurs under such circumstances. It appears that the larger particles quickly block the potential entry of the smaller particles, thereby preventing substantial invasion by even the smaller ones.

Moreover, it has been found that even when the largest particles of a latex are somewhat smaller than the calculated average pore diameter of a permeable stratum, it is no guarantee that substantial invasion will occur. Nevertheless, latex particle diameter is a critical factor in determining whether a certain latex will or will not invade a certain porous rock. Specifically, the largest particle diameter of a latex must be much smaller than the construction in the pores of a given permeable zone, if significant invasion is to be obtained.

In view of the fact that present technology does not permit a detailed description of the flow channels in a porous rock nor does it permit a precise, statistically sound measurement of latex particle diameter, the particular latex most suited for a given rock is best determined by laboratory tests, as described later, using the principles set out above as a guide.

The character of a porous subterranean formation amenable to treatment in accordance with the present invention must include at least one relatively more permeable interval and at least one relatively less permeable interval. Best results are obtained when the permeability of the less permeable interval or intervals differs from the permeability of the relatively more permeable interval or intervals by a factor of at least two.

The critical step of the process is to introduce into the borehole a latex having a relatively narrow range or distribution of elastomer particle sizes, the average particle diameter being small enough to permit substantial invasion of the more permeable zone or zones, and large enough to prevent substantial invasion of the less permeable zone or zones. Once it has penetrated a substantial distance, it is preferably coagulated Coagulation may be achieved in any one of at least three ways. In many formations the naturally occurring brine will inherently cause coagulation, once substantial penetration of a latex is achieved, by the relatively slow and unreliable process of diffusion and mixing in situ. In the event that such inherent coagulation is unsatisfactory, it is adequate to follow the latex with an artificial brine or a low pH water, which will serve essentially the same purpose. The third and preferred alternative is to include with the latex a delayed action coagulant which will react in situ after a suitable invasion has occurred. An example of a delayed coagulant is a mixture of hydrogen peroxide and formaldehyde. The pH of this mixture slowly drops, until the latex is made sufficiently acid to coagulate.

It may then be desirable to backflow the well in order to remove the excess latex which adheres to the less permeable intervals without invading. The backflow does not remove the coagulated latex from the more permeable, invaded zone or zones.

The essence of the invention lies in the discovery that a latex can be selected which will invade a given earth stratum of relatively high permeability, but will not invade a stratum or zone having a substantially lower permeability. The basis of the selection is the size of the dispersed elastomer particles. In accordance with one embodiment of the invention, a core sample taken from a zone of relatively high permeability is subjected to a series of invasion tests, first with a latex having a particle diameter too large to invade the core, and then with latices having successively smaller particles, until a latex is selected having particles of a diameter just small enough to invade sufficiently for the purpose of effectively plugging or sealing the formation. The selected latex is then injected into the wellbore, whereupon it will invade and plug the zone from which the core was taken, including all other zones of equal or greater permeability. Zones of significantly smaller effective pore size will not be appreciably invaded. Excess latex can easily be removed from the face of the non-invaded zones by temporarily backflowing the well, or by resuming normal flow in the case of a production well.

In the event that the permeability of the more permeable zone or zones exceeds the permeability of the less permeable zone or zones by a relatively great margin, for example by a factor of about 10, the selection of a suitable latex for selectively plugging the more permeable zone or zones need not be limited to those latices having a substantially uniform particle diameter. A relatively broad range of particle diameters can be tolerated, without appreciable loss of selectivity.

On the other hand, the selection of a latex having a relatively uniform particle size is preferred when treating a well wherein the permeabilities of the different zones are not so widely separated. In treating such a reservoir, some undesired shallow plugging of the relatively less permeable zones may occur. But the treatment in such cases is by no means a failure. The zones which become inadvertently plugged are reopened by enlarging the affected interval of the borehole and thereby exposing a fresh surface, beyond the extent to which the undesired invasion has occurred. Enlargement of the borehole is accomplished by a conventional drilling technique, known as underreaming. The more permeable zones are not reopened by such enlargement because of the greater extent of invasion.

The following data show that latex invasion, followed by coagulation, is an effective method for plugging a porous earth formation, including both consolidated and unconsolidated sands. The permeability of the cores to distilled water, $K_w$, was measured before and after plugging.

| | $K_w$ (md.) Before | $K_w$ (md.) After | Percent Reduction |
|---|---|---|---|
| Unconsolidated Sand | 13,800 | 130 | 99.4 |
| Torpedo Sandstone | 1,480 | 3 | 99.5 |
| Weiler Sandstone | 177 | 0.2 | 99.7 |

The accompanying graph illustrates the relationship between latex particle diameters and the average pore size of an invadable formation, as determined by subjecting various sandstone cores to latex invasion tests. The number of inches of latex invasion, obtained at a pressure differential of 50 p.s.i., is plotted versus the square root of the ratio of the permeability in millidarcies, $K$, to the porosity, $\phi$, of a given core. This value, $\sqrt{K/\phi}$, is proportional to the effective pore size of a porous medium. See, for example, pages 128-131 of Physical Principles of Oil Production, by Morris Muskat.

Each of the curves is characteristic of a given latex, and each data point on a given curve was determined by subjecting a different sandstone core to an invasion test with the same latex. A series of cores was arbitrarily chosen to provide a broad range of effective pore diameters. In this manner, it is convenient to obtain any desired number of additional curves to establish the "invasion potential" of various other latices.

A separate family of curves is necessary to establish these same relationships with respect to limestone, for example, and still another set of curves for dolomite, and so on for each mineralogical type of sedimentary formation.

Then, when selective plugging of a relatively more permeable zone of a particular formation is desired, reference to that set of curves which corresponds to the given mineralogical type enables a field worker to readily select the proper latex for the job. For example, referring again to the drawing, the latex of curve II will not invade a sandstone interval having a value for $\sqrt{K/\phi}$ of about 20 or less, but will invade sandstone intervals having larger effective pore diameters.

What is claimed is:

1. In a porous subterranean formation penetrated by a borehole, wherein the permeability of a first interval of said formation is at least twice as great as the permeability of a second interval of said formation, the method of selectively plugging said first interval to the substantial exclusion of said second interval, which comprises injecting through said borehole a mixture containing hydrogen peroxide, formaldehyde and a polymeric elastomer latex having an average particle size small enough to permit substantial invasion of said first interval by said latex but large enough to prevent substantial invasion of said second interval, the amounts of hydrogen peroxide and formaldehyde, respectively, contained in said mixture being sufficient to gradually lower the pH of said latex, thereby causing delayed coagulation.

2. A method of decreasing the water-to-oil ratio produced from a porous subterranean formation penetrated by a borehole, wherein the permeability of a water-producing interval of said formation is at least twice as great as the permeability of the oil-producing interval of said formation, by selectively plugging said first interval to the substantial exclusion of said second interval, which comprises injecting into said borehole an elastomer latex containing formaldehyde and hydrogen peroxide in amounts sufficient to gradually lower the pH of said latex, the average particle size of said latex being small enough to permit substantial invasion of said water-producing interval, but large enough to prevent substantial invasion of said oil-producing interval, and then resuming production of fluids from said borehead after a time sufficient to permit substantial coagulation of said latex within the pores of said water-producing interval.

References Cited by the Examiner

UNITED STATES PATENTS

| | | | |
|---|---|---|---|
| 2,121,036 | 6/1938 | Irons | 166—32 |
| 2,264,037 | 11/1941 | Haskell | 166—10 |
| 2,272,672 | 2/1942 | Kennedy | 166—10 |
| 2,272,673 | 2/1942 | Kennedy | 166—10 |
| 2,366,036 | 12/1944 | Leverett et al. | 166—38 |
| 2,912,380 | 11/1959 | Groves | 175—72 |
| 3,085,977 | 4/1963 | Park et al. | 252—8.5 |
| 3,123,158 | 3/1964 | Gallus | 166—33 |
| 3,158,210 | 11/1964 | Cannon et al. | 175—72 |

JACOB L. NACKENOFF, *Primary Examiner.*

CHARLES E. O'CONNELL, *Examiner.*

T. A. ZALENSKI, *Assistant Examiner.*